H. H. SOUTHWORTH & F. W. WOLF, Jr.
REFRIGERATING APPARATUS.
APPLICATION FILED OCT. 17, 1910.
1,034,657.
Patented Aug. 6, 1912.
3 SHEETS—SHEET 2.
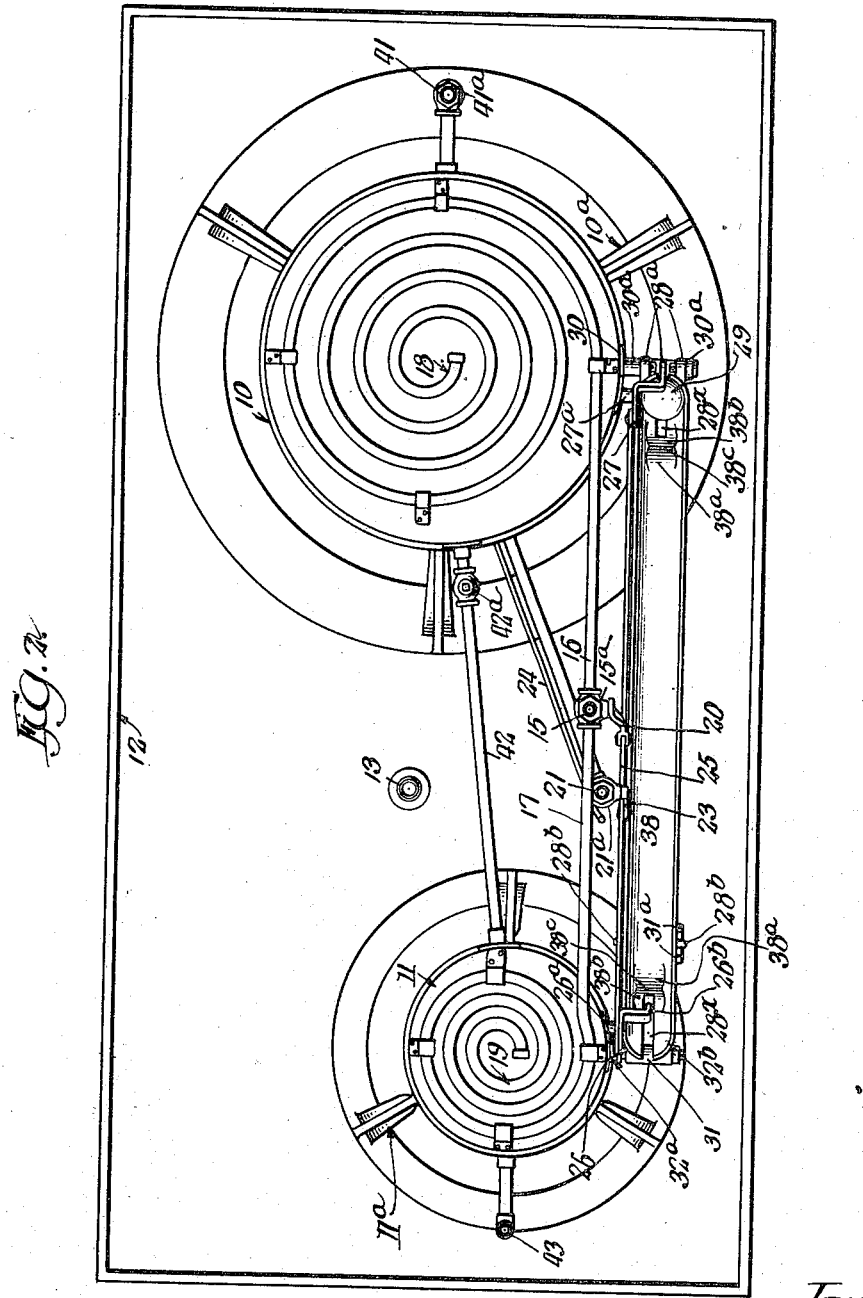

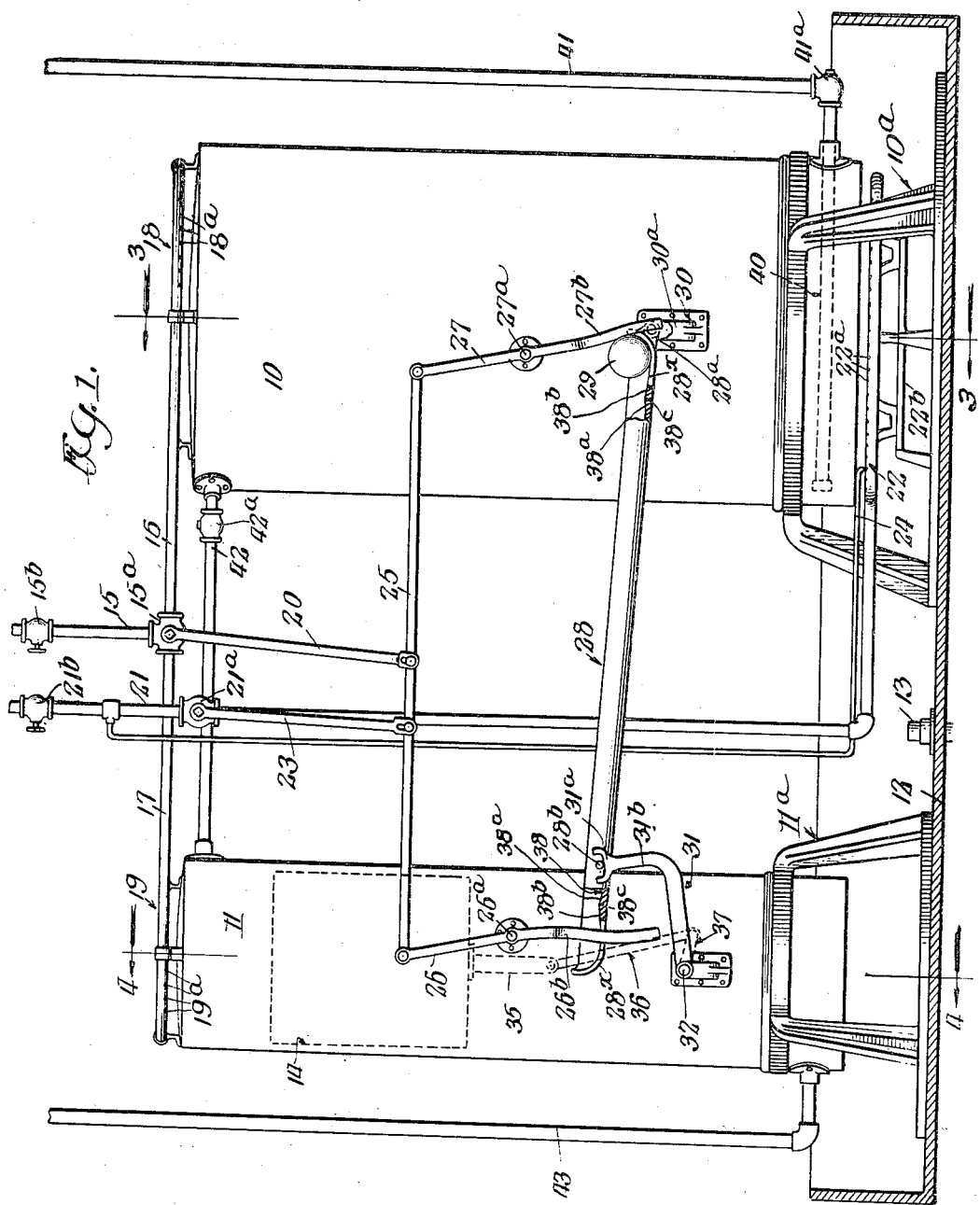

H. H. SOUTHWORTH & F. W. WOLF, Jr.
REFRIGERATING APPARATUS.
APPLICATION FILED OCT. 17, 1910.
1,034,657.
Patented Aug. 6, 1912.
3 SHEETS—SHEET 3.
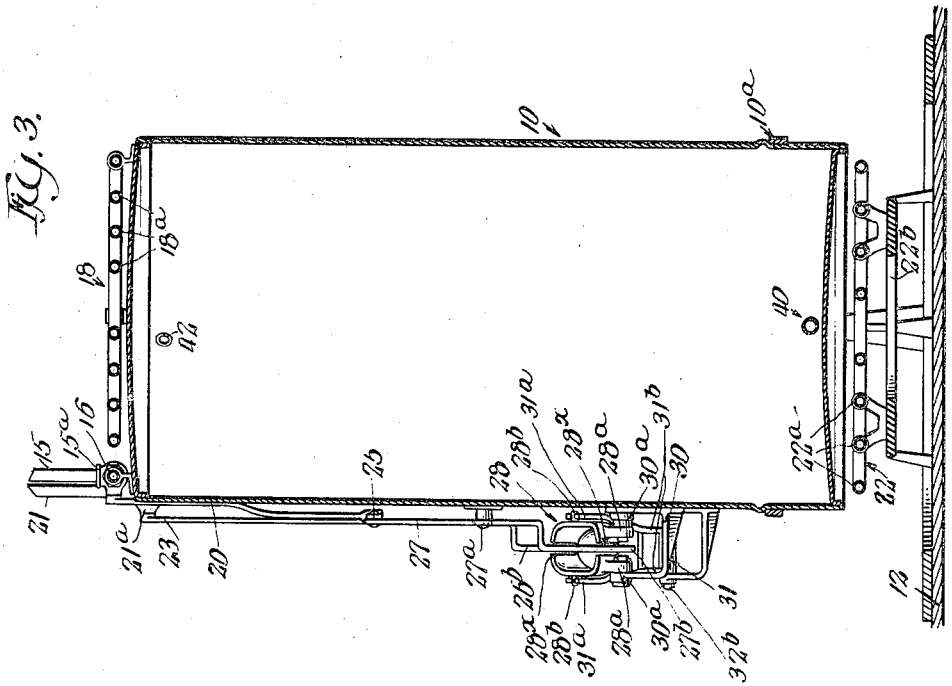
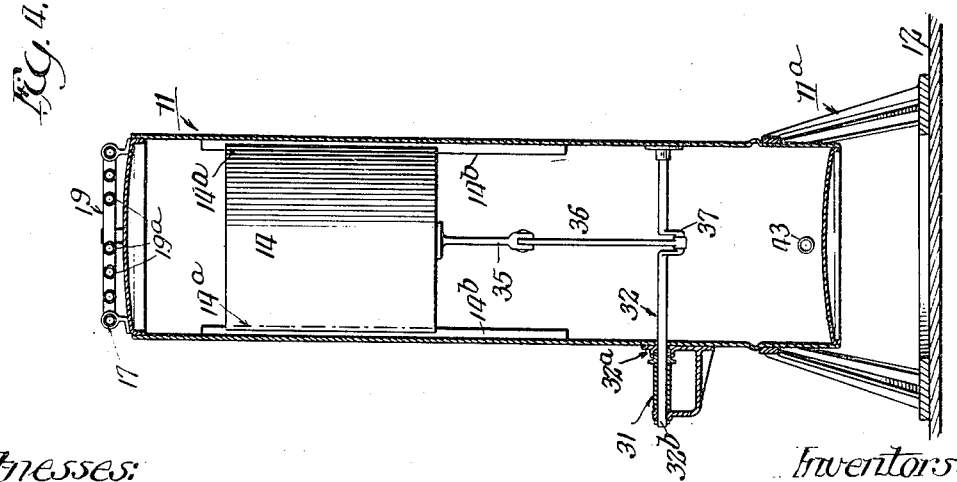

UNITED STATES PATENT OFFICE.

HARRISON H. SOUTHWORTH AND FRED W. WOLF, JR., OF CHICAGO, ILLINOIS, ASSIGNORS TO ICELESS REFRIGERATOR COMPANY, OF CHICAGO, ILLINOIS, A CORPORATION OF ILLINOIS.

REFRIGERATING APPARATUS.

1,034,657. Specification of Letters Patent. Patented Aug. 6, 1912.

Application filed October 17, 1910. Serial No. 587,486.

*To all whom it may concern:*

Be it known that we, HARRISON H. SOUTHWORTH and FRED W. WOLF, Jr., citizens of the United States, and residents of Chicago, in the county of Cook and State of Illinois, have invented certain new and useful Improvements in Refrigerating Apparatus; and we do hereby declare that the following is a full, clear, and exact description thereof, reference being had to the accompanying drawings, and to the letters of reference marked thereon, which form a part of this specification.

This invention relates to improvements in refrigerating apparatus and particularly to refrigerating apparatus of the absorption type.

The invention is shown herein as applied to an apparatus of the intermittent absorption type. A refrigerating apparatus of this kind includes a generator absorber containing liquor which, during certain periods of time, receives and absorbs ammonia gas delivered to it from the refrigerating coils, this action continuing until it has become substantially saturated with the ammonia gas, and during the alternate periods of time said generator absorber gives off ammonia gas under pressure, which is passed through a condenser and then delivered in liquid form to a receiver. From the receiver the liquid ammonia is conveyed through an expansion valve beyond which it expands as a gas through the refrigerating coils whence it is returned to the generator-absorber. During the first mentioned period, that is to say, while receiving the expanded ammonia gas from the refrigerating coils, the generator-absorber is subjected to the action of cooling water or other cooling means, while, during the second period, it is heated, usually by gas, so as to drive the ammonia gas from the saturated or strong liquor. The application of heat is continued until substantially all of the ammonia gas is driven off, leaving weak liquor in the generator-absorber. The generator-absorber is then ready to absorb ammonia gas again. The apparatus thus necessarily includes cooling and heating means adapted to alternately cool and heat the generator-absorber. The control of this heating and cooling means has heretofore required manual operation, and the present invention relates to a novel construction and arrangement of the apparatus, whereby the cooling and heating means are controlled automatically.

In an intermittent absorption apparatus wherein the ammonia gas is driven from the generator-absorber and is delivered to the receiver as liquid ammonia intermittently, it is apparent that the level of the liquid ammonia in the receiver will alternately rise to a maximum height and descend to a minimum height, approaching the maximum height during the period when the generator-absorber is giving off ammonia gas and approaching the minimum during the period when the generator-absorber is absorbing gas. The maximum level is reached when substantially all the ammonia gas has been driven from the generator-absorber and the minimum level is reached when the liquor in the generator-absorber has become substantially saturated with ammonia gas. That is to say, the maximum and minimum heights of liquid ammonia in the receiver occur substantially at the periods of time when it is necessary to alternately apply the cooling and heating means to the generator-absorber.

In carrying out our invention, we make use of the varying height of the liquid ammonia in the receiver and provide mechanism whereby the variation in height of the liquid ammonia in said receiver will effect the control of the alternate application of the cooling and heating means to the generator-absorber. To this end we provide a float in the receiver which rises and falls with the varying level of the liquid ammonia in the receiver and connect said float with the mechanism for controlling the means for alternately cooling and heating the generator-absorber, said mechanism being actuated by the float to apply the cooling means to the generator-absorber when said float is at its maximum level and to apply the heating means to said generator-absorber when said float is at its minimum level.

The invention consists of the matters hereinafter described and more particularly pointed out in the appended claims.

In the drawings:—Figure 1 is a front elevation of our improved refrigerating apparatus. Fig. 2 is a top plan view of the same. Fig. 3 is a vertical section through the absorption drum on the line 3—3 of Fig. 1. Fig. 4 is a vertical sectional view of the receiver condenser on the line 4—4 of Fig. 1.

In that embodiment of our invention illustrated in the accompanying drawings, 10 indicates a drum which constitutes a generator-absorber and 11 a drum which constitutes a receiver and condenser. For convenience and economy we have, in the present example, combined the condenser and receiver in one drum, but this is not essential and a separate condenser may be used. We shall therefore refer to the drum 11 as the receiver, since, as will appear, it is due to its function as a receiver that said drum is of importance in the operation of the apparatus. Said drums are respectively supported on suitable standards 10$^a$, 11$^a$ and are of any usual construction adapting them for use in connection with a refrigerating apparatus. The standards 10$^a$, 11$^a$ rest in a tank 12 which is adapted to receive the cooling water as it falls from said drums. The tank 12 is provided with an outlet pipe 13 which may be led to any desirable place for disposal of the water. Within the receiver drum 11 is located a float 14 which is adapted to rise and fall with the varying level of the liquid ammonia in the receiver. Said float may be of any convenient construction and is provided with vertical grooves 14$^a$, 14$^a$ in its outer surface within which engages guide bars 14$^b$, 14$^b$ secured to the inner walls of the drum 11. Said float is operatively connected, as will presently appear, to the mechanism which controls the supply of cooling water to the generator-absorber drum, and also to the mechanism which controls the supply of gas to the burner which heats the generator-absorber drum.

15 is a main water supply pipe which is connected by a T-joint 15$^a$ to branch pipes 16, 17, the one 16 leading to a cooling coil 18 located above the absorption drum 10, and the one 17 leading to a cooling coil 19 located above the receiver drum 11. Said coils are respectively provided with perforations 18$^a$, 19$^a$ on their under sides through which the cooling water flows upon the top of the associated drum.

20 is a lever which operates a two-way cock located in the T-joint 15$^a$ and is adapted to shift the water from the coil 18 above the generator-absorber drum to the coil 19 above the receiver drum and back again. A hand valve 15$^b$ is provided in the main water supply pipe 15.

21 is a gas supply pipe leading to a burner coil 22 located below the generator-absorber drum, and provided with burner openings 22$^a$. Said burner is supported on a standard 22$^b$ which rests on the bottom of the trough 12. A cock 21$^a$ located in the pipe 21 is adapted to control the supply of gas to the burner 22. Said cock is operated by a lever 23. A pilot burner 24 which is supplied with gas from the main supply pipe at a point beyond the cock 21$^a$ serves to light the burner 22.

21$^b$ is a hand valve located in the gas supply pipe 21.

The levers 23 and 20, operating respectively the gas and water cocks, are arranged in substantially parallel relation and the respective cocks operated by them are so constructed that they will be operated by an equal movement of their respective levers. The lower free ends of said levers 23 and 20 are pivotally connected by pin and slot connections to a horizontal reciprocating link 25 which has its opposite ends pivotally connected to rocking levers 26 and 27, pivotally mounted on studs 26$^a$, 27$^a$ fixed to the outer walls of the drums 11 and 10, respectively.

28 is a trough-like runway arranged below the link 25 and forming a track for a ball 29. Said trough is pivotally connected at one end to a bracket 30 which is rigidly secured to the drum 10, and at its other end has pivotal connection with a rocking bell-crank lever 31 which is made rigid with a horizontal crank shaft 32, journaled within the receiver drum 11 and having a part 32$^b$ which projects through a stuffing-box 32$^a$ in one wall of said drum. The rocking bell-crank lever 31 is secured to the part 32$^b$ of said shaft. The bracket 30 has laterally separated arms 30$^a$, 30$^a$, which are pivoted to lugs 28$^a$, 28$^a$ formed near one end of the trough 28. Near the opposite end of said trough that is to say, that end near the receiver drum 11, said trough is provided with laterally projecting studs 28$^b$, 28$^b$, which rest within the Y-shaped ends 31$^a$, 31$^a$ of laterally separated arms 31$^b$ comprising the bell-crank lever 31. The lower ends 26$^b$, 27$^b$ of the rocking levers 26, 27 project through slots 28$^x$, 28$^x$ formed in the bottom and ends of the trough 28.

A plunger rod 35 is secured to the lower end of the float 14 and said plunger rod is connected by a link 36 to a crank-arm 37 made rigid with the shaft 32. It is apparent that, by reason of this construction, the bell-crank lever 31 will rise and fall with the rising and falling movement of the float 14 which, as before stated, rises and falls with the level of the liquid ammonia in the receiver drum. Said rising and falling movement is communicated to that end of the trough which is adjacent to the receiver.

The bottom 38 of the runway 28, on which the ball 29 rolls, is parallel to the longitudinal axis of the runway throughout its length except at each end, where said bottom is formed at an angle to said axis as indicated at 38$^a$, 38$^b$, said angular deflections being separated from the main bottom of the runway by humps 38$^c$ (see Fig. 1). This construction of the runway is substantially similar to that described in an application for Letters Patent filed on August 22nd, 1910, Serial Number 578,328, and its purpose is to retain the ball at that end of the trough at which it happens to be, until the trough has assumed its greatest inclination.

In the bottom of the generator-absorber drum 10 is located a perforated pipe 40 which projects through one wall of the drum and is there connected to a pipe 41 which leads from the refrigerator coils (not shown). Through said pipe the expanded ammonia gas after it has done its work in the refrigerating coils enters the drum 10 when it is being cooled and is absorbing ammonia gas. A check-valve 41ª prevents the flow of liquor or ammonia gas from the generator-absorber drum 10 through the pipe 41 toward the refrigerating coils, when the pressure in said generator-absorber drum rises owing to the heat applied to drive off ammonia gas therefrom. The upper ends of the drums 10 and 11 are connected by a pipe 42 through which the ammonia gas is driven from the drum 10 into the drum 11 wherein it is condensed. A check valve 42ª is located in said pipe 42 to control the flow of gas therethrough in the usual manner.

To the lower end of the receiver drum 11 is connected a pipe 43 through which liquid ammonia is conveyed to the expansion valve (not shown) beyond which it expands as a gas through the refrigerating coils.

The operation of the apparatus is as follows: Consider the parts in the relation shown in the drawings, when the liquid ammonia in the receiver 11 has reached its maximum level; when the cock in the T-joint 15ª is turned so as to direct the cooling water to the coil 18 above the generator-absorber drum 10, and the cock 21ª is turned so as to cut off the supply of gas to the burner coil 22, under the generator-absorber drum 10. Expanded ammonia gas is now flowing through the pipe 41 and the pipe 40 into the generator-absorber drum 10 wherein it is absorbed by the weak liquor therein, and liquid ammonia is flowing from the receiver drum 11 through the pipe 43 to the expansion valve. The operation continues in this way, the liquor in the generator-absorber drum 10 gradually absorbing ammonia gas, while the liquid ammonia in the receiver drum 11 is gradually decreasing in volume. The float 14 descends with the level of the liquid ammonia in the receiver, thus rocking the shaft 32 and with it the bell-crank lever 31 which permits the left hand end of the trough 28 to descend. The trough 18 gradually inclines toward the left until the float has reached its lowest level and the left hand end of the trough has descended to such a point that the part 38ᵇ at the right hand end of the trough bottom has passed through a horizontal position into a position in which it is slightly inclined to the left, whereupon the ball 29 passes over the hump 38ᶜ and rolls down the trough. Just before the ball reaches the limit of its rolling movement, and when it is traveling at its highest rate of speed it strikes against the lower arm 26ᵇ of the rocking lever 26 and rocks said lever which, through the link 25, shifts the levers 23 and 20, thereby operating the gas and water cocks so as to turn on the gas to supply the burner 22 under the generator-absorber drum 10, and to divert the cooling water from the coil 18 above the generator-absorber drum 10 to the coil 19 above the receiver drum 11. Ammonia gas is now driven from the generator-absorber drum 10 to the receiver drum 11 and, condensing in said drum, causes the level of the liquid ammonia therein to rise. This raises the float 14 which causes the left hand end of the trough 28 to rise. This continues until the float 14 reaches its maximum level whereupon the ball 29 rolls down the trough, now inclined to the right, as indicated in Fig. 1, and strikes the arm 27ᵇ of the rocking lever 27, thereby rocking said lever so as to shift the cock operating levers 23 and 20 back into the position indicated in the drawings. The cooling water is thus again diverted into the coil 18 above the generator-absorber drum 10, and the gas supply to the burner 22 under said drum is cut off. The operation then continues as before.

It will be apparent that the operation of our apparatus is entirely automatic requiring no attention whatever after it has once been started.

The apparatus is of particular advantage for use in connection with refrigerators where the employment of an attendant to give the requisite constant attention to its operation is not justified by economy.

While we have shown and described herein as illustrating one embodiment of our invention an apparatus embracing certain details of mechanical construction, it is apparent that these may be modified in various ways without departing from the spirit of the invention, and we do not wish to be limited in any way thereby except as hereinafter pointed out in the appended claims.

We claim as our invention:—

1. In a refrigerating apparatus of the absorption type, including a generator-absorber, means for alternately cooling and heating said generator-absorber, and a liquid ammonia receiver fed from said generator-absorber and in which the level of the liquid ammonia varies, means actuated by the change of level of the liquid ammonia in said receiver adapted for controlling said cooling and heating means.

2. In a refrigerating apparatus of the absorption type, including a generator-absorber, means for alternately cooling and heating said generator-absorber, and a liquid ammonia receiver fed from said generator-absorber and in which the level of the liquid ammonia varies, a float in said receiver adapted to rise and fall with the level of the liquid ammonia therein, and means actuated by said float adapted for controlling said cooling and heating means.

3. In a refrigerating apparatus of the absorption type, including a generator-absorber, a cooling water pipe adapted for supplying water to said generator-absorber, means for controlling the supply of water to said pipe, a gas burner adapted to heat said generator-absorber, means for controlling the supply of gas to said burner, and a liquid ammonia receiver fed from said generator-absorber and in which the level of the liquid ammonia varies, a float in said receiver adapted to rise and fall with the level of the liquid ammonia in said receiver, a rock shaft operated by said float, and mechanism intermediate said rock shaft and said gas controlling and water controlling means adapted to turn on the one and turn off the other.

In testimony, that we claim the foregoing as our invention we affix our signatures in the presence of two witnesses, this 5th day of October A. D. 1910.

HARRISON H. SOUTHWORTH.
FRED W. WOLF, Jr.

Witnesses:
   CLARENCE E. MEHLHOPE.
   T. H. ALFREDS.